United States Patent [19]

Rhodes

[11] 3,911,478

[45] Oct. 7, 1975

[54] METHOD AND APPARATUS FOR PROCESSING TEST SIGNALS WHICH CONVEY INFORMATION AS TO GAIN AND DELAY DISTORTIONS OF T.V. SYSTEMS

[75] Inventor: Charles W. Rhodes, Beaverton, Oreg.

[73] Assignee: Tektronix Inc., Beaverton, Oreg.

[22] Filed: Apr. 5, 1972

[21] Appl. No.: 241,118

[52] U.S. Cl. .................................... 358/10; 358/35

[51] Int. Cl.$^{2}$ .......................................... H04N 9/62

[58] Field of Search .................. 178/DIG. 4, 5.4 TE; 358/10, 35

[56] References Cited

OTHER PUBLICATIONS

Kelly – Color Video Tester Checks Distortion – Electronics – September, 1954 – pp. 128–131.

*Primary Examiner*—Richard Murray
*Attorney, Agent, or Firm*—Adrian J. La Rue

[57] ABSTRACT

A modulated sine-squared test signal processing technique and an electronic apparatus are employed provide information as to the gain and delay distortions of T.V. broadcast systems, particularly the relative chrominance-to-luminance distortions of T.V. broadcast color transmission systems. A test signal, which is a modulated sine-squared pulse of a desired half-amplitude duration containing both a low-frequency component and the side bands of a carrier at or very near the color subcarrier frequency, is applied to a specially designed frequency-selective filter for separating the low-frequency component from the side bands. Then these separated sideband signals components are applied to two detector circuits, which together with associated low-pass filters, detect the positive and negative envelopes of the modulated side bands and linearly adds the low-frequency component to each envelope. The peak amplitude of the resulting waveform is the low-frequency component plus the positive envelope, and the baseline part of the waveform is the low-frequency component plus the negative envelope, conveys all information contained in the test signal as to gain and delay distortions. This information is suitable for automated measurement, or it can be measured directly with a general-purpose oscilloscope.

21 Claims, 11 Drawing Figures

METHOD AND APPARATUS FOR PROCESSING TEST SIGNALS WHICH CONVEY INFORMATION AS TO GAIN AND DELAY DISTORTIONS OF T.V. SYSTEMS

BACKGROUND OF THE INVENTION

In a television picture color-signal transmission system, it is essential that the system has linear amplitude-to-frequency and phase-to-frequency characteristics. That is, all frequencies within the bandwidth of the system must be equally amplified and equally delayed to ensure proper color values and color registration respectively. Measurement of the phase-to-frequency relationship is much more difficult than that of the amplitude-to-frequency relationship. As the absolute delay is not important in such particular applications, it is customary to measure the departure from constant delay, which is called group envelope delay. However, such conventional methods are painstaking and equipment is costly. Other means of measuring delay distortion have been developed; in particular, a modulated sine-squared pulse technique has been developed to measure the relative gain and delay distortions which are especially important in all forms of color television transmission. Literature of the art describes the procedures necessary to determine these distortions. However, there is a need to make such measurements automatically, without any personnel at the point of measurement, and to telemeter the measured values of these distortions to supervisory stations. This would permit automated quality control over transmission. Applications include remote control over television transmitters, national and international networks, including coaxial cable and microwave systems, terrestrial and satellite.

SUMMARY OF THE INVENTION

According to the present invention, an apparatus is designed to process a modulated sine-squared pulse which contains information as to the relative gain and delay distortions of the chrominance-to-luminance signals in a color television broadcast system. Rather than measuring the amplitude-to-frequency and the group envelope delay characteristics over the entire video frequency range, it has been found desirable to measure the gain and delay of a set of low frequencies relative to a corresponding set of frequencies around the color subcarrier. The modulated sine-squared pulse can thus be used to measure two linear distortions which affect the saturation and color misregistry in any presently used PAL or NTSC broadcast color transmission system; these distortions are respectively the relative chrominance-to-liminance gain and delay. It can measure the color misregistry in the SECAM color system, which is due to group envelope delay.

The apparatus according to the present invention is very simple in construction, less expensive then alternate means and very useful for remote and automated quality control over transmission because only three quantities of the input signal are enough to determine the relative gain and delay distortions of the chrominance-to-liminance signals. Furthermore, the gain error into the apparatus can be annulled by a feedback means which controls the amount of input attenuation, so that the required attenuation gives the desired chrominance-to-liminance gain error value. Also, with the gain distortion data thus annuled, delay may be readily determined from the output signal.

It is therefore one object of the present invention to provide improved method and apparatus for measuring relative gain and delay distortions of the chrominance-to-luminance signals by employing a modulated sine-squared pulse processing technique.

It is another object of the present invention to provide improved method and apparatus for measuring distortions in color T.V. transmission systems by telemetering data to a computer or the like, facilitating automated and remote quality control.

It is still yet another object of the present invention to provide simple method and apparatus for measuring distortions in color T.V. transmission systems by measuring data directly with a less costly general-purpose oscilloscope.

The subject matter which I regard as my invention is particularly pointed out and distinctly claimed in the concluding portion of this specification. The invention, however, both as to organization and method of operation, together with further advantages and objects thereof, may be be understood by reference to the following description taken in connection with the accompanying drawings.

DRAWINGS

DETAILED DESCRIPTION

Figure 1:
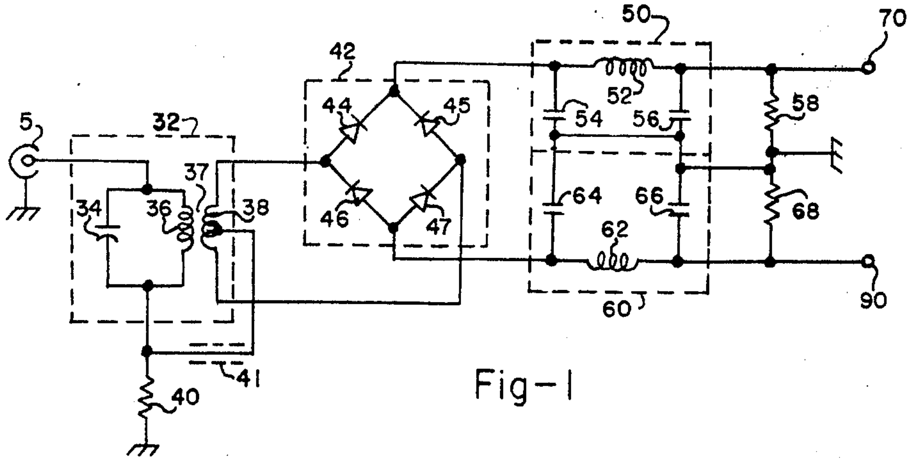
FIG. 1 is a circuit diagram of an important part of one embodiment according to the present invention.
Figure 3:
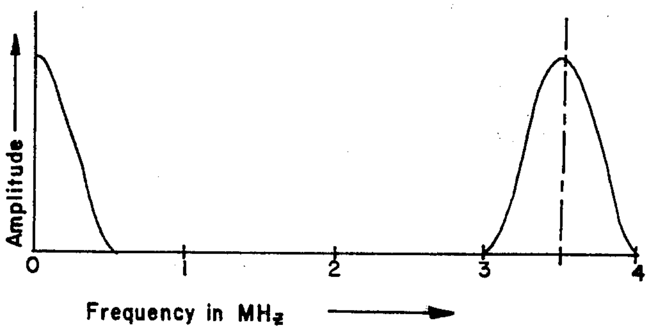
FIG. 3 is a frequency spectrum of a typical modulated sine-squared pulse.
Figure 4:
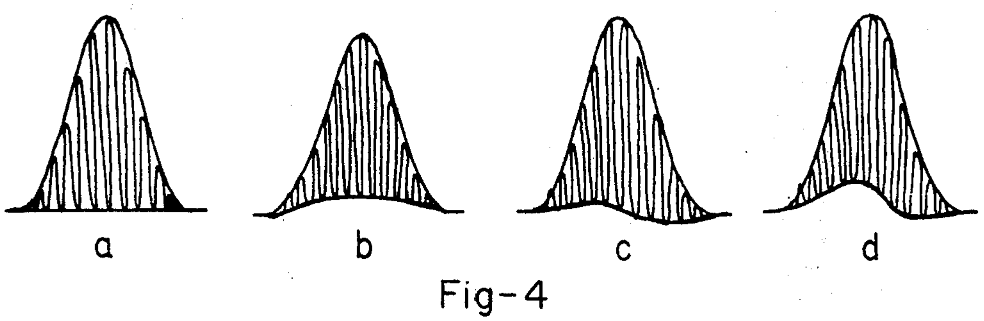
FIG. 4 shows examples of four possible modulated sine-squared test signal configurations as would be applied to the inputs of the circuits illustrated in FIGS. 1 and 10, and represent respectively (a) no distortion, (b) gain distortion only, (c) delay distortion only, and (d) both gain and delay distortion.
Figure 5:
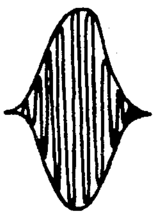
FIGS. 5 to 9 are waveforms at various points of the circuits illustrated in FIGS. 1 and 10.

Referring to FIG. 1 illustrating a partial circuit diagram of one embodiment according to the present invention, an input terminal 5 receives the modulated sine-squared test signal of FIG. 4. This pulse is formed in the conventional manner as follows: Initially a conventional pulse is shaped by appropriate $Sin^2$ filters, then applied to a double-balanced modulator, to which also is applied the color subcarrier which is approximately $3.58MH_z$ in NTSC and $4.43\ MH_z$ in the PAL systems. The output of the modulator is the 100% amplitude modulated sidebands of the carrier as shown in FIG. 5. Then the original sine-squared pulse is added linearly to the modulated pulse, producing a test signal as shown in FIG. 4*a*. FIG. 3 illustrates a frequency spectrum of the modulated sine-squared pulse, and it should be noted that the lower and higher spectrums correspond very closely to the frequency spectrums containing the main information of the luminance and chrominance respectively.

Figure 2:
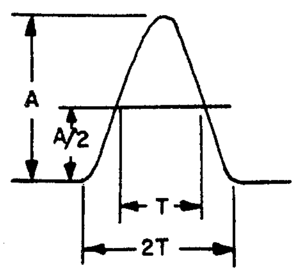
FIG. 2 is a waveform of a sine-squared pulse showing amplitude and time duration relationships.

The modulated sine-squared pulse is applied to a frequency-selective filter 32 to separate the sine-squared low-frequency pulse of FIG. 2 from the modulated carrier of FIG. 5. Filter 32 is composed of a capacitor 34 and an inductor 36 or the primary winding of a transformer 37. An inductor 38 magnetically coupled to the inductor 36 is provided to form the transformer. The other terminal of the capacitor 34 and the inductor 36 is returned to ground through a resistor 40. The quality factor and tuned frequency of the tank circuit comprising capacitor 34 and inductor 36 are selected such that only the higher-frequency component of the modulated sine-squared pulse is transmitted to the secondary winding 38 of the transformer 37. The lower-frequency component is developed across the resistor 40.

The voltage developed across the resistor 40 is supplied to the center tap of the secondary winding 38 of the transformer 37. Both terminals of the secondary winding 38 are connected to a detector 42 comprising four diodes 44, 45, 46 and 47 to form a bridge rectifier. The common junctions of the diodes 44, 45 and 46, 47 are respectively connected to output terminals 70 and 90 through low-pass filters 50 and 60. The low-pass filters 50 and 60 include respectively inductors 52 and 62 connected in series between the detector 42 and the output terminals 70 and 90, and a pair of capacitors 54, 56 and 64, 66 connected to ground at both terminals of the inductors 52 and 62. A pair of resistors 58 and 68 are connected in parallel with the capacitors 56 and 66 to provide discharge paths.

Figure 6:
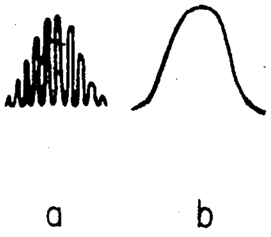
Figure 7:
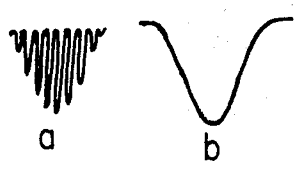

As the center tap of the secondary winding 38 of the transformer 37 divides the secondary winding 38 into two equal halves, the high-frequency component of FIG. 5 transmitted from the primary winding 36 is split into two halves as shown in FIGS. 6*a* and 7*a*. These halves are detected by bridge detector 42, the positive half appearing at the cathodes of diodes 44, 45 and the negative half appearing at the cathodes of diodes 46, 47. At the same time, the low-frequency signal developed across the resistor 40 is connected to the center tap of the secondary winding 38 as mentioned previously, causing the entire secondary winding 38 and the detector 42 to float up and down with the low-frequency signal.

A small delay means 41 will generally be required in the path of the low-frequency signal from resistor 40 to the transformer secondary 38. This low-frequency delay means 41 is to match the delay at subcarrier frequency experienced by the sidebands in passing through transformer 32. Such delay is small compared to the delay in the low pass filters, 50 and 60.

The low-pass filters 50 and 60 prevent the color subcarrier frequency component pulsations from appearing at the output terminals 70 and 90, since only their envelopes are desired. The time constant of the capacitor 56 and the resistor 58, similarly that of the capacitor 66 and the resistor 68, is selected much larger than the repetition rate of the color subcarrier so that only the envelopes of the outputs from the detector 42 as shown in FIGS. 6*b* and 7*b* can pass to output terminals 70 and 90. Also, since the low-pass filters 50 and 60 are referred to ground, and the detector is floating with the low-frequency signal, a linear addition of the low-frequency component and the envelopes of the high-frequency component occurs.

Figure 8:
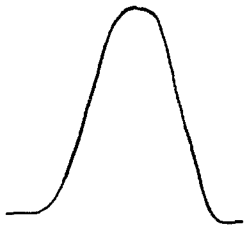

The linear addition of the low-frequency component and positive envelope of the high-frequency component appears at output terminal 70, and is shown in FIG. 8. Thus the waveform will be substantially identical to the positive peak portion of the envelope of the test signal, which can be seen by comparing FIGS. 4 and 8. Any appreciable gain or delay distortions of the system under test will cause this waveform to depart from the sine-squared pulse.

Figure 9:
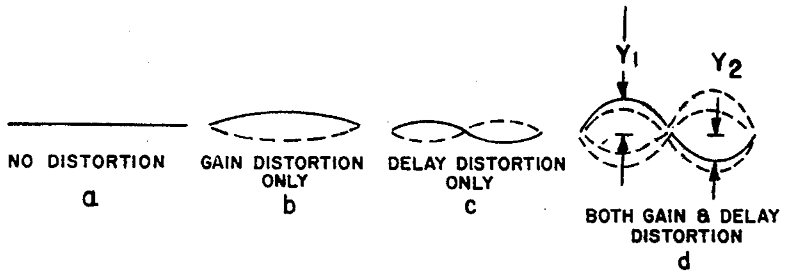

The linear addition of the low-frequency component and negative envelope of the high-frequency component appears at the output terminal 90, and is shown in FIG. 9. Thus the waveform will be substantially identical to the negative peak portion, or baseline, of the envelope of the test signal, and can be seen by comparing FIGS. 4 and 9.

These two waveforms, derived from the test signal by the foregoing process, convey all the information which the test signal carries. These may be displayed on a general-purpose oscilloscope having much less bandwidth than the usual television waveform monitor. Also, the information contained in the two waveforms can be extracted by a computer with numerical values of the transmission distortions presented to the operator.

Figures 10, 10A:
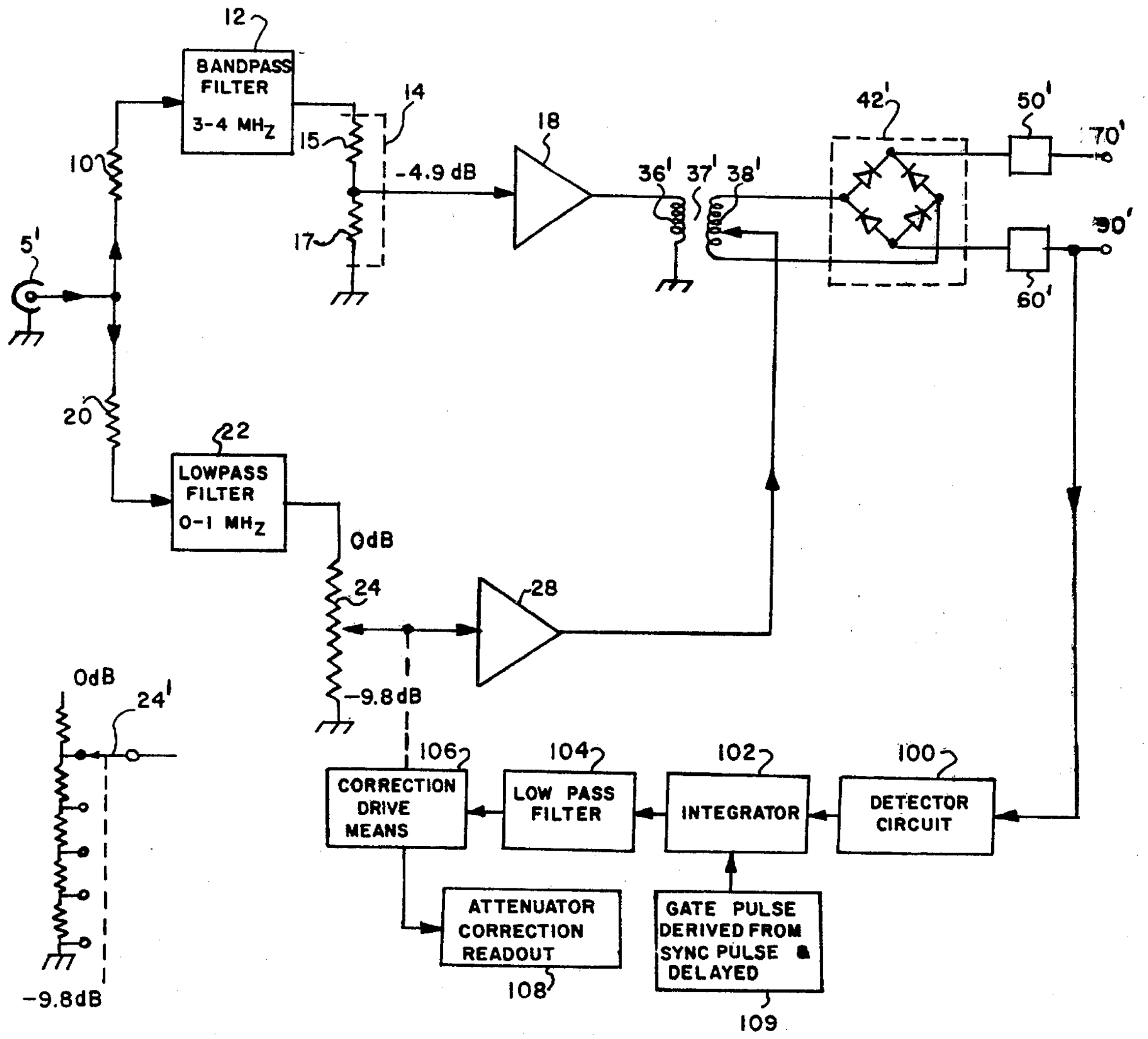
FIG. 10 is a detailed block diagram of an important part of another embodiment according to the present invention.
FIG. 10*a* shows an alternate attenuator configuration for attenuator 24 of FIG. 10.

Additionally, the integral of the baseline waveform shown in FIG. 9, which can be derived by gating an integrator circuit, will yield specific information as to chrominance-to-luminance gain. Using this integral, the measurements can be carried out automatically without recourse to a computer. FIG. 10 shows a detailed block diagram of another embodiment according to the present invention, wherein the derived integral is fed back to control a calibrated attenuator for the purpose of both annulling the gain distortion error into the apparatus and giving a numerical value of the error. Components which correspond identically to those shown in the circuit of FIG. 1 are identified by a prime superscript, i.e., 5'.

The modulated sine-squared test signal of FIG. 4 is connected to input terminal 5', then applied simultaneously through resistors 10 and 20 of equal value to bandpass filters 12 and 22 for the separation of the low- and high-frequency components. The input impedance looking into terminal 5' is equal the parallel combination of resistors 10 and 14. Bandpass filter 12 is tuned to allow only the previously discussed high-frequency component of the modulated sine-squared test signal to pass, and low-pass filter 22 is tuned to allow only the low-frequency component to pass. The high-frequency component is then applied to a 2:1 attenuator 14 comprising equal-value resistors 15 and 17. The values of resistors 15 and 17 are chosen to provide proper termination of the filter 12 and thus their total resistance is equal to the resistance of resistor 10.

The low-frequency component is applied to an attenuator 24 whose value is chosen to provide proper termination of the filter 22 and thus is equal to the resistance of resistor 20. Also, attenuator 24 is calibrated to the numerical amount of the maximum gain distortion anticipated; for example, the calibrated numerical value could be from 0 dB to −9.8 dB where the maximum gain distortion anticipated is plus or minus 4.9 dB. Attenuator 24 could be either a potentiometer as shown to provide continuously variable attenuation, or it could be a series of resistors between switch positions to provide incrementally variable attenuation.

The attenuated high- and low-frequency components are then passed through equal-gain impedance-matching amplifiers 18 and 28 respectively. As in FIG.

1, the high-frequency component is applied to the primary winding 36' of a transformer 37', and the low-frequency component is applied to the center tap of secondary winding 38'. Secondary winding 38', detector 42', and low-pass filters 50' and 60' operate as described for the circuit in FIG. 1, with the waveform of FIG. 8 present at output terminal 70' and the baseline waveform of FIG. 9 present at output terminal 90'.

The baseline waveform of FIG. 9 at output terminal 90' is applied through a detector circuit 100 to an integrator circuit 102 for the purpose of deriving the integral of the baseline waveform. This integral will be zero for the special case where $Y_1 = -Y_2$, that is, where the relative chrominance-to-luminance gain is zero. The integral will be a positive value when chrominance gain is less than luminance gain, and a negative value when chrominance gain is more than luminance gain.

The output from the gated integrator 102 is then applied to a low-pass filter 104 where it becomes a control signal to operate a correction drive means 106 which accurately changes the attenuation of attenuator 24. When the integral from integrator 102 becomes zero, that is, when the gain distortion of the signal applied to input terminal 5' is annulled, the proper attenuation has been attained and can be accurately displayed on a meter 108 or the like as gain distortion.

Furthermore, once gain distortion has been annulled, delay may be readily determined by detecting the amplitude of the peak-to-peak baseline sinusoid of FIG. 9c as a percentage of the peak amplitude of the waveform shown in FIG. 8. For example, for a 12.5T modulated sine-squared pulse, relative chroma delay in nanoseconds is equal to ten times the percentage of the peak-to-peak value of the baseline sinusoid of FIG. 9c with respect to the peak value of the FIG. 8 waveform. This data could be accurately displayed on a meter or the like also.

An alternative to the active attenuator detailed in the preceding paragraphs is to attenuate the chrominance carrier by an amount numerically equal to the maximum gain distortion anticipated, for example, 5 dB. At this point, chrominance loss is equal to luminance loss, and the calibration is for 0 dB gain distortion.

Many circuit arrangements for the envelop demodulation of the sidebands carried by the subcarrier may be considered within the scope of the present invention. The bridge detector and low-pass filters were chosen for simplicity of description.

While I have shown and described preferred embodiments of my invention, it will be apparent to those skilled in the art that many changes and modifications may be made without departing from my invention in its broader aspects.

I claim:

1. The method of processing a modulated sine-squared test signal, comprising:

separating said modulated sine-squared test signal into a low-frequency component and a high frequency component;

splitting the high-frequency component into a first signal having a positive polarity and a second signal having a negative polarity;

detecting the positive envelope of said first signal and the negative envelope of said second signal; and adding the separated said low-frequency component linearly to each such positive and negative envelopes of said first and second signals recovered from detection of said high-frequency component to form two measurement waveforms.

2. The method according to claim 1 wherein said low-frequency component of said modulated sine-squared test signal corresponds substantially to the luminance frequency spectrum.

3. The method according to claim 1 wherein said high-frequency component of said modulated sine-squared test signal corresponds substantially to the chrominance frequency spectrum.

4. The apparatus for processing modulated sine-squared test signals, comprising:

separation means for separating said modulated sine-squared pulse into a low-frequency component and a high-frequency component;

split means for splitting the high-frequency component into a first signal having a positive polarity and a second signal having a negative polarity;

detector means for detecting the positive envelope of said first signal and the negative envelope of said second signal; and addition means for adding the separated said low-frequency component linearly to each such positive and negative envelopes of said first and second signals recovered from detection of said high-frequency component to form two measurement waveforms.

5. The apparatus according to claim 4 wherein said separation means for separating said modulated sine-squared pulse into a low-frequency component and high-frequency component comprises a series combination of a resistor and a parallel-tuned tank circuit including a capacitor and a first inductor for producing said low-frequency and said high-frequency components thereacross respectively.

6. The apparatus according to claim 5, wherein said split means for splitting the high-frequency component into a first signal having a positive polarity and a second signal having a negative polarity comprises a center-tapped second inductor magnetically coupled to said first inductor to form a transformer.

7. The apparatus according to claim 6 wherein said detection means for detecting the positive and negative envelopes of said high-frequency component includes a bridge rectifier circuit and an associated pair of low-pass filters.

8. The apparatus according to claim 7 wherein said addition means for adding the separated low-frequency component linearly to each such positive and negative envelopes of said first and second signals recovered from detection of said high-frequency component to form two measurement waveforms comprises connecting the low-frequency component to the center tap of said second inductor via a delay thereby causing said second inductor and said bridge rectifier to move with the low-frequency component such that the two measurement waveforms with respect to a fixed reference are linearly added.

9. The apparatus according to claim 8 wherein said two measurement waveforms correspond identically to each the envelope of the positive peak portion of the modulated sine-squared test signal and the envelope of the negative peak portion, or baseline, of the modulated sine-squared test signal.

10. The apparatus according to claim 4 wherein said separation means for separating said modulated sine-squared pulse into a low-frequency component and a high-frequency component comprises a parallel pair of frequency-selective filters specifically tuned to pass only the desired frequency component.

11. The method of annulling gain distortion carried by a modulated sine-squared test signal, comprising:
- processing said modulated sine-squared test signal to obtain two measurement waveforms;
- obtaining a control signal from the measurement waveform containing substantial information as to gain distortion and;
- employing said control signal to change a variable attenuator until said gain distortion is annulled.

12. The apparatus for annulling gain distortion carried by a modulated sine-squared test signal, comprising:
- processing means for processing said modulated sine-squared test signal to obtain two measurement waveforms;
- error recognition means for obtaining a control signal from the measurement waveform containing substantial information as to gain distortion; and
- correction means for employing said control signal to change a variable attenuator until said gain distortion is annulled.

13. The apparatus according to claim 12 wherein said processing means for processing said modulated sine-squared test signal to obtain two measurement waveforms includes a pair of frequency-selective filters, a pair of attenuators, a pair of equal gain impedance matching amplifiers, a transformer, a bridge detector, and a pair of low-pass filters.

14. The apparatus according to claim 13 wherein said error recognition means for obtaining a control signal from the measurement waveform containing substantial information as to gain distortion includes a detector circuit, an integrator circuit, and a low-pass filter.

15. The apparatus according to claim 14 wherein said correction means for employing said control signal to change a variable attenuator until said gain distortion is annulled comprises an electric motor to mechanically change the value of attenuation.

16. The apparatus for providing direct readout of gain and delay distortions carried by a modulated sine-squared test signal, comprising:
- processing means for processing said modulated sine-squared test signal to obtain two measurement waveforms;
- error recognition means for obtaining a control signal from the measurement waveform containing substantial information as to gain distortion;
- correction means for changing a calibrated variable attenuator until gain distortion is annulled;
- interpretation means for direct readout of gain distortion; and
- second interpretation means for direct readout of delay distortion.

17. The apparatus according to claim 16 wherein said processing means for processing said modulated sine-squared test signal includes passing the signal, through a pair of frequency selective filters, a pair of attenuators, a pair of equal gain impedance matching amplifiers, a transformer, a bridge detector, and a pair of low-pass filters and, a calibrated variable attenuator.

18. The apparatus according to claim 17 wherein said error recognition means for obtaining a control signal from the measurement waveform containing substantial information as to gain distortion includes an integrator circuit.

19. The apparatus according to claim 18 wherein said correction means for changing a calibrated variable attenuator until gain distortion is annulled comprises an electric motor to mechanically change the value of attenuation.

20. The apparatus according to claim 19 wherein said interpretation means for direct readout of gain distortion includes a meter or the like to display an numerical amount of corrective attenuation required to annul said gain distortion.

21. The apparatus according to claim 20 wherein said second interpretation means for direct readout of delay distortion includes a meter or the like to display a multiple of the percentage of one of said measurement waveforms with respect to the other said measurement waveform when gain distortion is annulled.

* * * * *

UNITED STATES PATENT OFFICE
CERTIFICATE OF CORRECTION

PATENT NO. : 3,911,478

DATED : October 7, 1975

INVENTOR(S) : Charles W. Rhodes

It is certified that error appears in the above-identified patent and that said Letters Patent are hereby corrected as shown below:

Column 1, line 54, "liminance" should be --luminance--

Column 1, line 63, "liminance" should be --luminance--

Column 1, line 67, "liminance" should be --luminance--

Column 2, line 1, "annuled" should be --annulled--

Column 2, line 23, "may be be understood" should be --may be understood--

Column 6, line 43, "detection" should be --detector--

Signed and Sealed this

*fourth* Day of *May 1976*

[SEAL]

*Attest:*

RUTH C. MASON
*Attesting Officer*

C. MARSHALL DANN
*Commissioner of Patents and Trademarks*